Nov. 20, 1962   O. SCHUELLER   3,064,364
SPACE CHAMBERS
Filed Oct. 4, 1960
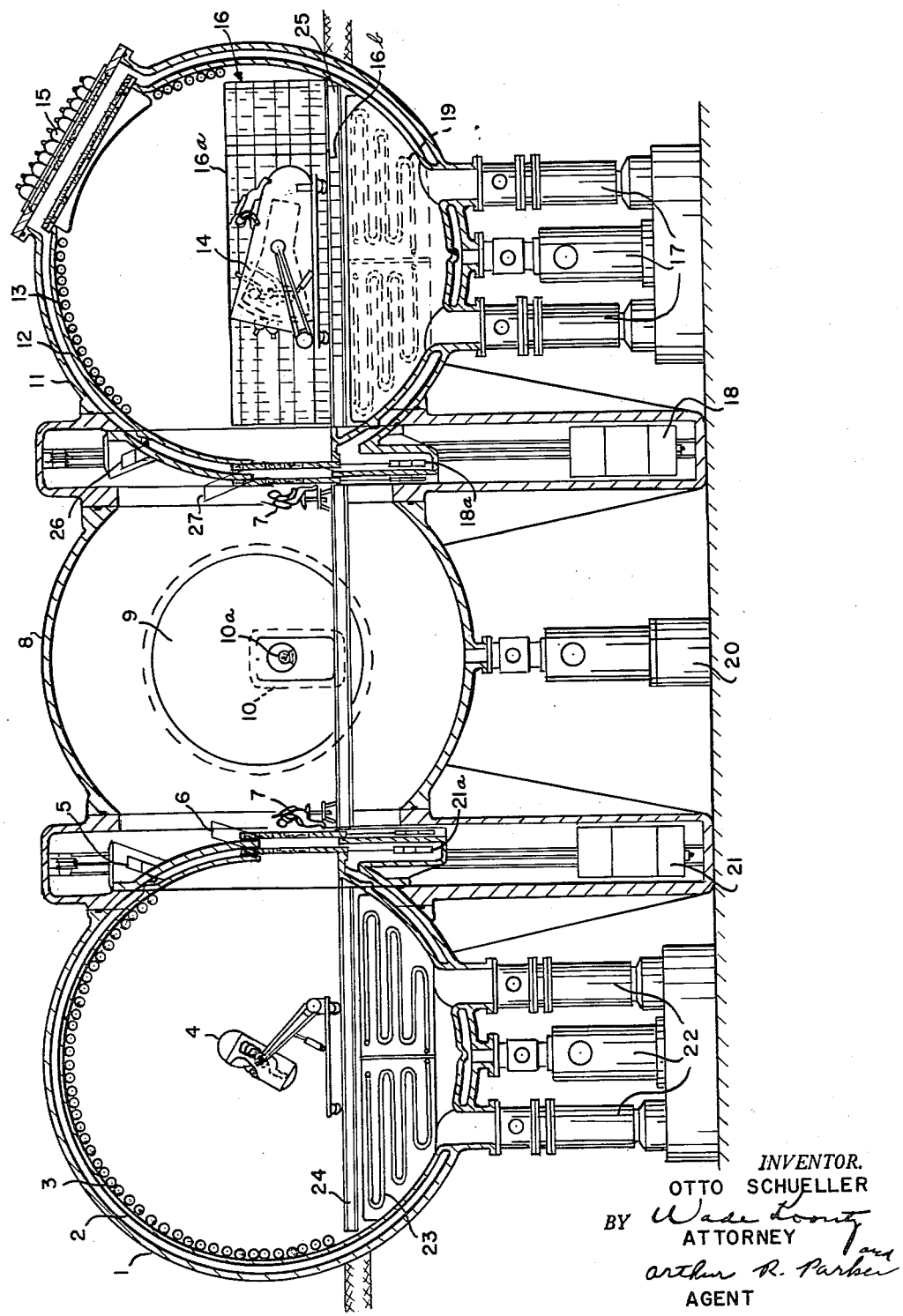
INVENTOR.
OTTO SCHUELLER
BY *Wade Looney*
ATTORNEY
*Arthur R. Parker*
AGENT

United States Patent Office 3,064,364
Patented Nov. 20, 1962

3,064,364
SPACE CHAMBERS
Otto Schueller, Dayton, Ohio, assignor to the United States of America as represented by the Secretary of the Air Force
Filed Oct. 4, 1960, Ser. No. 60,527
9 Claims. (Cl. 35—12)
(Granted under Title 35, U.S. Code (1952), sec. 266)

The invention described herein may be manufactured and used by or for the United States Government for Governmental purposes without payment to me of any royalty thereon.

This invention relates generally to the simulation of space flight conditions in outer space and, more particularly, to novel means for approximating the hazards and environmental conditions to be encountered in orbital or space flight, and this application for Letters Patent is an improvement over my copending application, Serial No. 6,330, filed on February 2, 1960, now Patent No. 3,010,220.

The successful launching of the first unmanned satellites in orbit arond the earth constitutes the advent of a new era of space flight indicating an urgent need for immediate and rapid research and development in this field with the end view in mind of launching manned space vehicles, first, into orbit around the earth and, thereafter, into interplanetary flights. Thus, the pendency of space flights both in orbit around the earth and to the other planets imposes new and extremely intricate problems on the space scientist and engineer which problems have not been previously encountered in the field of the now all but routine aircraft flights within the earth's atmosphere except for extremely rare instances. It is quite evident, therefore, that considerable research and development remains before such problems may be successfully solved primarily in the field of environmental testing for the express purpose of substantially reproducing the actual conditions expected to be encountered in manned space flights. In this regard, a number of devices designed to facilitate the simulation of the approximate temperature and pressure conditions found in outer space must be developed, for example, to test the suitability and reliability of personal protective equipment and assemblies, as for example, space suits, capsules and life support systems. Moreover, the effect of the extremes of space conditions on the space man must be determined previous to actual flights into outer space in order that the proper selection and training of astronauts and their required equipment may be accomplished through research into the physiological and ecological problems related to survival outside the earth's atmosphere and their probable effect on man during extended periods of flight. In fact, the space scientist and/or engineer must, himself, be properly and fully qualified to adequately prepare and train the space man or astronaut for future space flight. If the latter goal is to be accomplished in the most expeditious manner, considerable and immediate large scale research and development in these areas must be effected with the aim of obtaining adequate knowledge leading to the solution of the previously mentioned various physiological and ecological problems and determining their effect on the survival of the astronaut in outer space. Thus, some means for adequately simulating conditions of outer space is considered essential for the purpose of determining the effects and reactions of the astronaut to various environmental conditions of outer space. The determination of these effects of outer space on man prior to his actual entry into outer space is believed to be the most fundamental factor present in the entire study of space flight.

It is the object of the present invention, therefore, to provide an improved and yet simplified means for facilitating basic research in the field of space flight ultimately designed to precondition personnel to substantially all of the environmental conditions of outer space flight and thus assist in the selection of qualified astronauts and other space flight personnel.

It is a further object of the present invention to provide a flight simulator device for reproducing and subjecting equipment and personnel to the high vacuum conditions of outer space.

A still further object of the invention is to provide a flight simulator incorporating improved means for simulating and exposing prospective space personnel and equipment to the effects of solar radiation while outside the protection of the earth's atmosphere.

Another object of the invention resides in the provision of novel and improved means for cooling the space chamber section to thus facilitate the simulation of extreme temperature ranges when considered with adjacently positioned space chamber sections of the same facility.

An additional object of the present invention is to provide a combined facility having a plurality of interconnecting space chambers formed as a test facility and comprising greatly simplified construction incorporating an improved cooling system for substantially effecting the extremes of temperatures encountered in outer space.

Other objects and advantages of the invention will become apparent from the following description, taken in connection with the single FIGURE of the drawing which represents a somewhat schematic, partially broken away, cross-sectional view illustrating details of the improved test facility of the invention.

Two of the major problems which must be solved in the development of manned satellites and other manned space vehicles before man may be sent into the conquest of outer space include the development of complex life support systems automatically balancing man's changing biological requirements against the extreme conditions of outer space as well as that encountered on the planets and during the re-entry phase of operation and, additionally, the provision of mobility to enable a man to perform useful work while in the aforesaid environments. Thus, the development and construction of specially designed space chambers for test purposes and for reproducing the above-mentioned environmental conditions of outer space is naturally of extreme importance.

In view of the above requirements, therefore, the test facility of the present invention has been developed and involves an improved combination of three interconnected chambers including one chamber for reproducing the extreme cold phases of space flight, a second chamber for reproducing the extreme hot phases of space flight and a safety chamber positioned therebetween for instantaneously reversing previous test conditions and thus simulate the event of an emergency situation.

Among the actual environments to be encountered in the exploration of outer space, the moon and the nearer planets, in orbits around the earth to include the vicinity of the moon, an exposure to a solar energy of 1400 watts per square meter and an atmospheric pressure approaching that of a perfect vacuum is present. On the moon itself, the same solar radiation exposure of 1400 watts per square meter is present with an estimated atmospheric pressure on the surface of $10^{-5}$ to $10^{-1}$ mm. Hg. At 50 miles altitude above the surface of the moon, the pressure is approximately equal to that present at 50 miles altitude above the surface of the earth; however, the specific composition of the atmosphere surrounding the moon is questionable but probably includes a higher proportion of rare gases than the earth's atmosphere. The temperature extremes to be encountered on the moon varies between 210° and 275° F. for a full moon center or between a —135° to a —243° F. for a new moon center. Further, the moon includes mountains varying in altitude up to 25,000 feet or almost as high as Mt. Everest. Additionally, many craters pockmark the surface of the moon and vary in diameter from a few miles or less to 150 miles. Also, photometric and radio data indicate a substantial layer of dust on the surface of the moon several inches deep.

In regard to the planet Venus, a solar energy of 2600 watts per square meter can be expected. Its atmospheric pressure is questionable. However, as to the composition of its atmosphere, the best available information indicates that carbon dioxide is its principal constituent at approximately 95 mm. Hg. pressure which equals 250 times as much per unit value than that at the earth's surface. In addition, traces of oxygen, methane, ammonia and water have been found present in the atmosphere of the planet Venus. The temperatures on the planet Venus on the day side of the upper cloud layer thereof varies between 120° F. to 140° F., whereas, the temperature on the dark side of the upper cloud layer varies between 0° F. and —13° F. On the hard surface thereof, it has been estimated that the temperature is approximately 585° F. The composition of the dense cloud layers surrounding the planet Venus is not known. The atmosphere below the aforesaid clouds probably extends for approximately 300 miles and radio data indicates the previously mentioned temperature of approximately 585° F. on the hard surface of Venus which is probably due to a greenhouse type of heating effect resulting from the thick cover of cloud layer.

Travel to the planet Mars would probably subject the astronaut to an exposure of solar energy in the order of 590 watts per square meter and to an atmospheric pressure estimated as being between 65 to 150 mm. Hg; however, it cannot be more than one-fifth of the atmospheric pressure on earth. A study of the composition of the atmosphere on Mars indicates the presence of oxygen of not more than 15% of that found in the earth's atmosphere. Carbon dioxide is also present in quantity approximately twice that of the earth's atmosphere and water vapor has been found present in amounts equal to between 0.6% and 5% of that found on earth. The mean temperature of Mars has been determined to be from —4° F. to —22° F. with an average summer temperature of 50° F., an average winter temperature of —40° F. and a polar night temperature dropping to between —90° F. and —100° F. Furthermore, white, violet and blue clouds (probably ice), and yellow dust clouds have been discovered surrounding the planet Mars. In addition, five-eighths of the surface of Mars appears to be a desert of red or orange color, probably consisting of layers of metal oxide and mountains less than 5,000 feet in altitude are present.

One of the most important considerations in the study and continual research in the field of space flight resides in one inescapable fact, namely, future astronauts will of necessity be required to perform certain missions outside their space vehicle, as for example, the assembling of space stations and the repair and maintenance of reconnaissance platforms, relay stations, and observatories as well as the exploration on foot of the nearer planets. These actions would, of course, necessitate the utilization of some means to protect space personnel while engaging in operations outside their space vehicle and thus exposed to the extremes of ambient space conditions. In order to properly protect space personnel while engaged in the above-mentioned extremely hazardous missions, three basic methods may be utilized. A diving-type space suit may be developed with the traditional back unit oxygen supply system or a pressurized cabin with arm sections or manipulators, integrated to and removable from the space vehicle, may be used, as for example, that shown in my co-pending patent application, Serial No. 97,116 filed March 20, 1961, or lastly, remote controlled manipulators and tools may be constructed integrally mounted on the space vehicle itself. It is obvious that each of the aforesaid methods of protecting space personnel may have its own particular field of application. For example, the diving type of space suit may be most adaptable for use on permanent space stations and space buses having air locks and pressurized compartments available and large enough to permit their use and removal. The space cabin or remote manipulator type may be more suitable for use where no permanent station has, as yet, been constructed in order to provide a small "living room" until such time as the permanent construction is completed.

Regardless of which of the above-mentioned three types of personal protective assemblies is used, appropriate protection and relative ease of movement must be afforded the space man while being submitted to the environmental hazards found in outer space. More specifically, such personal protective equipment must provide a tolerable climate, oxygen supply, communication, propulsion and facilitate the ability to perform useful work. Thus, food, water and waste disposal over long periods must be provided for and, depending on the duration of the specific mission, either open cycle systems as found on conventional aircraft may be utilized for missions of a few hours duration or, closed cycle respiratory systems with prestorage of food and oxygen and disposal of wastes for missions up to approximately two weeks duration, or, closed ecological systems with treatment of some waste products as urine to recover water for missions of from two to four weeks to one year or more duration and, finally, the closed ecological system with regeneration of all waste products for missions of an indefinite duration. The latter includes the use of algae as a means of food and/or oxygen with certain chemical processes for producing the required oxygen supply. As a further example of the type of environmental condition required, or at least, highly desirable for prolonged flights into outer space involves the maintenance of a comfortable climate within the cabin space during both work and rest periods. Recent studies indicate that the sedentary or slightly active man is comfortable when the dry bulb temperature is within the range of 73° F. to 77° F. and the relative humidity is within the range of 25 to 60%. The latter values will, of course, be somewhat different in a closed cycle, ventilated capsule or suit as is described in more detail in my co-pending patent application, Serial No. 97,116, filed March 20, 1961.

The human tolerance to the environmental stresses to be encountered during flight into outer space is not comparable to the tolerance of equipment. As an example, air borne equipment in a modern bomber is specifically designed to withstand a temperature range of from —65° F. to +250° F. for a pressure range from vacuum to full atmospheric pressure and for a relative humidity range from 0 to 100%. However, in the future most airborne equipment will be required to withstand even more extreme temperature requirements, probably up to 1,000° F. as a result of heating by aerodynamic friction. It is noted that maintenance of the proper temperature in an instrument satellite during orbit is not difficult since the range of tolerable temperature is wide and the heat output of both equipment and instruments is predictable. It is only necessary to utilize the appropriate coatings on satellite surfaces having certain emissivity coefficients for both infrared and visible light. Maintenance of a comfortable temperature in a manned capsule or space suit by radiative heat transfer during orbiting or interplanetary flight is another matter and is much more difficult since the comfort range of man is quite small and his heat output is generally unpredictable and frequently changes greatly with emotional stress. Moreover, heat generation from the oxygen conditioning system varies in approximately the same ratio. For example, the carbon dioxide production and water elimination from the man both increase in proportion to his activity and heat output. Moreover, chemical absorption of the carbon dioxide and water are also heat generating processes. Further, internal temperature conditions of the space vehicle are varied and further aggravated through extreme change in several external parameters. For example, reconnaissance vehicles will undoubtedly be in continuous sunshine for periods of several days due to an inclination of their orbit at an angle of more than 60° to the equator. The lunar day, it is noted, lasts for approximately fourteen earth days. A space worker, on the other hand, may take a rest period in the extreme cold of the shady side of a space platform or that occurring during the lunar night within a space cabin. Thus, in order to maintain a proper heat balance, the design of an appropriate life support system and protective assembly must be accomplished with the coincidence of a number of extreme external and internal environmental parameters taken into consideration, as for example, lunar night or periods of orbiting in the shade of the earth or of a space station simultaneously with the lowest heat generation by man and equipment and, second, lunar day or periods of continuous orbiting in sunshine simultaneously with the highest generation of heat by man and equipment and, thirdly, periods of aerodynamic heating during the re-entry phase of operation. The above-described complex problems and situations are to a large extent reproduced and studied in the improved test facility of the present invention to be described in detail hereinafter.

Referring now to the single figure of the drawing, the test facility of the subject invention is illustrated as consisting primarily of three main sections interconnected as a unitary or continuous integrally formed system. The leftmost section constitutes a cryo-cooled chamber having an outer wall 1, an inner wall 2 and a plurality of refrigerant coils 3 for liquid nitrogen and arranged in circumferential, adjacent relation to the inside circumference of said inner wall 2. Said left chamber is specifically assigned to simulate the most extreme cold condition which may be encountered in outer space, as for example, that encountered when the space man is resting in the shade of a space platform or during periods of lunar night while positioned, for example, within a mobile boom-mounted worker capsule or extensible space worker cabin as indicated generally at 4. During these times, the amount of internal heat generated by the man and his equipment as well as that generated by environmental heat irradiation is at a minimum. The low radiative temperature of outer space is substantially simulated by cooling the blackened inner walls of inner chamber 2 with liquid or cold gases, as for example, helium, liquid nitrogen or liquid air, liquefied in recirculating cryostats. Said liquid gas is circulated within the previously mentioned plurality of refrigerant coils 3, and a high degree of vacuum is maintained within the inner chamber by means of vacuum pumps and recirculating cryostats positioned preferably in the basement within the housing indicated generally at 22. The specific nature of the vacuum pumps and the recirculating cryostats is not shown since they form no part of the present invention.

The previously described left chamber also incorporates a pair of relatively large and a pair of relatively small chamber doors indicated respectively at 5 and 6 for said outer and inner walls 1 and 2, which doors are also counterweighted as indicated respectively at 21 and 21a. The aforesaid space worker cabin 4 is slidably mounted on a platform indicated at 24 and positioned within the inner wall 2 of the cryo-cooled or left chamber are the helium cooling traps 23 which incorporate liquid or cold helium refrigerant gas at a temperature of about 20° K. in order to condense air leaking and out-gassing from test objects positioned within said chamber and thus maintain an approach to the near vacuum of outer space by substantially assisting the operation of the previously-mentioned vacuum pumps.

During operation of the above-described left chamber, liquid, as for example, liquid nitrogen is circulated through the plurality of refrigerant coils 23 by means of the recirculating cryostat indicated schematically at 22 and the vapors formed from the circulating liquid nitrogen as a result of the extraction of heat formed within said inner wall 2 are reliquefied by said cryostat and returned in a continuous cycle to said refrigerant coils. A certain amount of leakage of air naturally occurs from the objects being tested, especially if the object so tested is a pressure suit. Moreover, even water vapor at skin temperature will be given off from mechanical or partial pressure suits. Therefore, in order to greatly assure the maintenance of a sufficiently high vacuum within the test chambers of the instant invention and to substantially eliminate heat transfer between the outer and inner walls 1, 2 thereof, the previously-mentioned helium cooling traps 23 are utilized.

The right chamber constitutes a solar radiation chamber having an outer wall 11, an inner wall 12 and a plurality of refrigerant coils 13 preferably provided with freon gas and arranged in circumferential, adjacent relation to the inside circumference of said inner wall 12. Said right chamber is designed to simulate or reproduce the other or hot extreme of environmental conditions which may be encountered in outer space, as for example, that encountered when the space man is working on the sunny side of either a space vehicle or on the moon. It is during these periods that both the environmental heat and the heat egnerated by the space man himself and from his equipment is at a maximum. In said right chamber, direct radiation from the sun is simulated by a combination of carbon arc lamps, high-pressure mercury vapor lamps, tungsten lamps, filters and reflectors all indicated generally at 15 in the drawing as being integrally mounted in position on the upper hemispheric portion of both outer and inner walls 11, 12. Indirect solar radiation, on the other hand, is simulated by a combination of reflectors and infrared radiators indicated generally at 16 as arranged both in a circumferentially disposed ring section 16a relative to a manned space compartment element indicated schematically at 14 and also within the chamber floor or platform 25 as indicated schematically at 16b on which said manned space compartment element 14 is slidably positioned. Said solar radiation simulators 15 are further subdivided into smaller units to facilitate flexibility by covering a range of irradiation intensity from 590 watts per square meter as found on the planet Mars, for example, to 1400 watts per square meter as found in orbit around the earth to 2600 watts per square meter as found in proximity to the planet Venus without modifying the spectral energy distribution. Thus, by switching on an appropriate number of sun lamps and infrared radiators as desired, the total irradiation falling onto the test object positioned within the manned space compartment element 14 may be adjusted in accordance with its configuration.

Since the aforesaid indirect solar radiation which is reflected, scattered, and emitted by both the earth and atmosphere is approximately 40% of the direct solar radiation it, of course, must definitely be considered and provided for in the test chamber. In connection with the latter, it is noted that earth satellites are still relatively close to the surface of the earth and, accordingly, are considerably influenced by the indirect solar radiation emitting therefrom. Moreover, if the size of the earth were reduced to that of a ball one foot in diameter, the orbit of a satellite at 300 miles altitude would be at a distance of less than one-half inch from its surface. On the other hand, an explorer satellite of the planet Venus would experience a solar radiation of approximately twice that on earth. Further, during a lunar day on the moon, a space suit would experience its greatest heat input from the infrared radiation emitting from the surface of the moon as well as from craters and mountain walls found on the moon.

In order to properly prepare the prospective astronaut for the rigors of space flight, the test facility of the present invention must, of course, simulate or reproduce various environmental space conditions with reasonable accuracy. In order to accomplish the latter, the most extreme environmental conditions of outer space must be considered in connection with the most extreme human factor parameters. In connection therewith, it is further noted that the radiation temperature of the so-called "star-speckled" outer space is 3.2° K. and without the stars, the temperature would be absolute zero. Again, solar irradiation in the vicinity of Mars and Venus ranges from 590 watts per square meter to 2600 watts per square meter, respectively. Further, the surface temperature on the moon ranges from 120° K. for the new moon center to 408° K. for the full moon center. Finally, the extreme temperature condition prevailing as a result of aerodynamic heating during the re-entry phase of space flight must also be given due consideration.

In regard to the simulation of extreme cold, it has been determined that any attempt to approximate the absolute zero degree temperature of outer space through use of either liquid or cool gaseous helium would, in fact, require an excessive amount of refrigerant. However, liquid nitrogen having a boiling point of 77° K. is utilized instead of the helium as a refrigerant for the black chamber walls to effect a more feasible solution to the above problem and thus assuring temperatures sufficiently low for test purposes.

To compute the radiant energy normally transferring between isothermal surfaces separated by nonabsorbing medium, the following equation may be utilized:

$$Q_{1-2} = e_1 e_2 F_{1-2} S A_1 (T_1^4 - T_2^4)$$

where $Q_{1-2}$ = the rate of net heat transfer from surface $A_1$ to surface $A_2$
$e_1, e_2$ = surface emissivities
$F_{1-2}$ = Lambertian geometric configuration factor from surface $A_1$ to surface $A_2$
$S$ = Stephan-Boltzman constant
$A_1, A_2$ = surface areas
$T_1, T_2$ = absolute temperatures Thus, from the above equation it is stated that the net heat transfer from a surface zone $A_1$ of uniform temperature $T_1$ of the test object to the chamber wall $A_2$ of uniform temperature $T_2$ is directly proportional to the difference between the fourth powers of their absolute temperatures. If it be assumed that the surface temperature of a space cabin on the side facing the black sky would drop to 273° K. or 32° F. during a lunar night, the difference in the radiative heat exchange from reality at a chamber wall temperature of 80° K. (as in the left chamber of the test facility of the present invention) instead of the actual 3.2° K. would be as follows:

For reality, $273^4 - 3.2^4$ or, in other words, $55.5 \times 10^8$, whereas, that reproduced at a chamber wall temperature of 80° K. would be $273^4 - 80^4$ or, in other words $(55.5 - 0.41) \times 10^8$ which signifies an accuracy within 99.3% or less than 1% error. Moreover, even if the surface temperature of the space cabin would drop to 180° K. (−135° F.), the accuracy of reproduction with the inventive test facility would still be 96.3% or less than 4% error.

The previously-described increase of radiative heat transfer with the fourth power of the absolute temperatures requires that also the walls of the solar radiation chamber be cooled even though irradiation of heat is occurring. This seemingly paradoxical situation prevails since, without cooling, the chamber walls would heat to a point above room temperature and, accordingly, would radiate back to the test object even though, in reality, a large portion of its surface would be exposed to the near absolute zero temperature of outer space. However, since the surface temperature of a space suit or capsule in sunshine is higher than that during a lunar night because of the combination of direct and indirect solar irradiation, cooling of the black chamber walls of the right chamber, for example, of the subject invention by means of a freon cascade refrigeration system as indicated by the refrigerant coils 13 in the right chamber is accomplished to substantially duplicate this environmental condition of outer space. The latter event occurs since such cascade refrigeration systems are, in fact, very practical for producing extremely low temperatures of approximately −130° F. Thus, assuming a surface temperature of the test object, as for example, the manned compartment of a space vehicle as previously indicated at 14 in the right chamber of the present invention, to be 300° K. (80° F.) with the temperature of the inner chamber wall 12 at 183° K. (−130° F.), the test facility of the subject invention would effect a quite close approximation to the actual conditions of outer space as indicated below:

| Actual radiation into space: | Reproduction |
|---|---|
| $300^4 - 3.2^4$ | $300^4 - 183^4$ |
| $81 \times 10^8$ | $(81 - 11.2) \times 10^8$ |
| 100% | 86.3% accuracy or 13.7% error. |

The same comparison for a wall temperature of −200° F. would give an accuracy of 94.7% or an error of only 5.3%. However, it is emphasized that the above-described examples of relatively small errors existing between actual space conditions and those capable of reproduction by the inventive test facility refer to that part of radiation exchanged with the black sky. The overall error would be only a fraction of these values when the total heat interchanged including radiation received both from the sun and the surface of the moon is considered. Utilization of liquid nitrogen as expendable coolant in the refrigeration system of the solar radiation or right chamber of the subject invention as well as that of the cold or left chamber may be easily substituted for the present freon and recirculating cryostat when liquid nitrogen becomes more readily available.

An observer indicated at 7 may be positioned in alternate positions as shown within the intermediate or safety chamber to observe into either left or right chambers through a pair of observation ports incorporated within both the relatively large and small chamber doors of either the left or cold chamber or right or hot chamber. In connection therewith, the intermediate or second chamber constitutes a safety chamber having an outer wall 8, a large chamber door 9 and a small chamber door 10 having an observation window 10a for an outside observer. Said safety chamber is also equipped with a vacuum pump system indicated generally at 20 which is utilized for a purpose similar to that of the vacuum pump of the cryo-cooled or left chamber.

The aforesaid right or solar radiation chamber also incorporates a plurality of helium cooling traps 19 for a purpose similar to that of the helium cooling traps 23 utilized with the left or cryo-cooled chamber and, additionally, utilizes a pair of relatively large and a pair of relatively small chamber doors indicated respectively at 26 and 27 for said outer and inner walls 11 and 12, which doors are likewise counterweighted as indicated respectively at 18 and 18a. Finally, the solar radiation chamber incorporates a vacuum pump and cryostat system indicated schematically at 17.

Thus, it is clearly seen that the present inventive test facility comprises an improved cryo-cooled chamber combined with an improved solar and infrared radiation chamber integrally formed as a single facility with an intermediate or safety chamber positioned therebetween. A double-wall principle is utilized for both chambers and the space between said walls is maintained at an extremely low pressure to thereby simplify problems of mechanical structure and vacuum sealing. Furthermore, the aforesaid vacuum space when combined with the use of highly reflective opposite wall surfaces improves both heat and cold insulation. Although the intermediate or safety chamber appears unnecessarily large, the floor area and door openings thereof must be of the same relative size as those of the cyro-cooled and solar irradiation chambers in order that full utilization thereof and transfer therebetween may be facilitated.

The test facility of the present invention constitutes an improved system for substantially reproducing certain major environmental conditions of outer space and to test the feasibility of space suits and space capsules as well as other test objects while undergoing the hazards of expected outer space environments.

I claim:

1. A test facility for reproducing the environmental conditions of outer space including a cryo-cooled chamber section having a test object adapted to be mounted therewithin for subjection thereof to the cold temperature extremes of outer space, said cryo-cooled chamber section consisting only of a main outer wall, an inner wall and liquid gas coolant means formed as a plurality of refrigerant coils positioned in circumferential relation to the inside of said inner wall and mounted within the upper hemisphere of said chamber in contacting relation to the interior surface of said inner wall and constituting first heat transfer inhibitor means for substantially eliminating heat transfer inwardly from said outer wall into the interior of said cryo-cooled chamber for cooling said chamber section to temperatures below a predetermined temperature, a heat chamber and test object adapted to be positioned therein, said heat chamber including a plurality of sun radiation simulators and infrared radiators positioned therein in overhead relation to the test object, said heat chamber including an outer wall and an inner wall in spaced concentric relation thereto and second liquid gas coolant means mounted adjacent to, and in contact with the interior surface of said inner wall and constituting heat transfer inhibitor means for substantially eliminating heat transfer from within the interior of said heat chamber, and a plurality of cooling traps positioned within said cryo-cooled and heat chambers below said test objects to condense any air leakage from said test objects and thus counteracting the effect thereof on the vacuum conditions in said chambers.

2. A test facility for reproducing the environmental conditions of outer space as in claim 1, said cryo-cooled chamber section having a horizontal platform affixed therein at a position extending above said cooling traps for receiving an extensible space worker cabin thereon adapted to receive a man in a space suit for exposing said man and the vehicle to the extreme cold range of outer space.

3. A test facility for simulating the environmental conditions of outer space comprising a plurality of integrally arranged test chambers respectively exposing a test object to the opposite extremes of outer space conditions, including a first section housing a double-walled cryo-cooled, high-vacuum chamber incorporating means for substantially reproducing the low radiative temperature of outer space, a second section housing a double-walled solar radiation chamber spaced from said first chamber and incorporating means for substantially reproducing both indirect and direct solar radiation of outer space and a third section housing a safety chamber having an escape door and positioned between and integrally formed in communication with said first and second chambers, the double-walled cryo-cooled and solar radiation chambers each consisting of concentrically disposed, outer and blackened inner walls spaced relative to each other, and means substantially preventing heat loss and heat gain, respectively, from within and out of the interior of said cryo-cooled and solar radiation chambers comprising a plurality of circulating liquid gas-filled cooling coils mounted in concentric and contacting relation to the inside circumference of said inner walls in contact therewith to provide an independent cooling screen between said inner walls and the interior of said chambers, and a plurality of cooling traps positioned within each of said cryo-cooled and solar radiation chambers in the bottom portions thereof to condense any air leaking from test objects mounted within said chambers and thus maintain the vacuum conditions thereof.

4. A test facility for simulating the environment conditions of outer space as in claim 3, said solar radiation chamber incorporating a platform disposed at floor level for supporting a manned compartment device in slidable relation thereon and a plurality of sun radiation simulators positioned in overhead relation to subject the manned compartment device to the simulated direct radiation of the sun and a plurality of circumferentially disposed infrared radiators arranged in surrounding relation to the manned compartment device exposing the latter to the simulated direct radiation of the sun.

5. A test facility for simulating the environmental conditions of outer space as in claim 4, said sun radiation simulators comprising a plurality of carbon-arc lamps, high-pressure mercury vapor lamps, tungsten lamps, filters, and reflectors positioned in overhead relation on the upper hemisphere of said chamber for simulating the direct radiation of the sun, and said infrared radiators being arranged in a ring section in circumferential relation to the manned compartment device and in a second section on said platform to cover an intensity range of from 590 watts per square meter to 2600 watts per square meter.

6. A test facility for simulating the environmental conditions of outer space as in claim 5, and a pair of slidably mounted, counterweighted doors disposed between each of said cryo-cooled and solar radiation chambers on opposite sides of said safety chamber and movable between a lower, closed position and an upper, open position to facilitate rapid transfer between the opposite extreme temperature ranges of said plurality of test chambers.

7. A test facility for simulating the environmental conditions of outer space as in claim 6, said plurality of circulating liquid gas-filled cooling coils constituting a cascaded refrigeration system arranged within the upper hemisphere of said cryo-cooled and solar radiation chambers in surrounding relation to an extensibly mounted space worker cabin device for cooling the latter by radiative heat exchange with a temperature background of an extreme cold temperature range approaching that of absolute zero.

8. A test facility for reproducing the environmental conditions of outer space including a first section housing an evacuated cryo-cooled chamber, a second section housing an evacuated solar radiation chamber integrally formed and in indirect communication with said first section to facilitate transfer of test objects therebetween, said evacuated cryo-cooled chamber consisting only of an outer wall, a blackened inner wall positioned in spaced, concentric relation to said outer wall and liquid-cooled, refrigerant coil means mounted between the interior of said cryo-cooled chamber and said inner wall facilitating cooling of said inner wall and substantially shielding the interior of said cryo-cooled chamber from heat transfer thereto, the plurality of liquid cooled, refrigerant coil means containing liquid gas circulating therethrough and arranged in circumferential, contacting relation to the inner surface of said inner wall, said evacuated solar radiation chamber having only an outer wall, an inner wall mounted in spaced, concentric relation to said outer wall and liquid-cooled, refrigerant coil means between the interior of said solar radiation chamber and said inner wall in circumferential contact therewith facilitating cooling of said inner wall and substantially shielding the interior of said solar radiation chamber from heat transfer thereout, and means for subjecting the interior of said solar radiation chamber to high temperatures including first means positioned therewithin simulating the direct radiation of the sun and second means positioned therewithin simulating the indirect radiation of the sun.

9. A test facility for reproducing the environmental conditions of outer space as in claim 8, and means insuring near vacuum conditions within said first- and second-named chambers and to substantially eliminate heat transfer between the inner and outer walls thereof comprising a plurality of cooling traps positioned therewithin incorporating liquid gas refrigerant to condense excess air and/or liquid from test objects mounted within said chambers.

References Cited in the file of this patent

UNITED STATES PATENTS

| | | |
|---|---|---|
| 1,827,530 | LeGrand | Oct. 13, 1931 |
| 2,939,316 | Beecher et al. | June 7, 1960 |
| 3,010,220 | Schueller | Nov. 28, 1961 |